(12) United States Patent
MacDonald (10) Patent No.: US 10,159,369 B2
(45) Date of Patent: Dec. 25, 2018

(54) COOLING STRAW

(71) Applicant: Gregory Michael MacDonald, Alameda, CA (US)

(72) Inventor: Gregory Michael MacDonald, Alameda, CA (US)

( * ) Notice: Subject to any disclaimer, the term of this patent is extended or adjusted under 35 U.S.C. 154(b) by 0 days.

(21) Appl. No.: 14/716,896

(22) Filed: May 20, 2015

(65) Prior Publication Data

US 2015/0335186 A1 Nov. 26, 2015

Related U.S. Application Data

(60) Provisional application No. 62/001,582, filed on May 21, 2014.

(51) Int. Cl.
*A47G 21/18* (2006.01)
*B29L 23/00* (2006.01)

(52) U.S. Cl.
CPC .......... *A47G 21/187* (2013.01); *A47G 21/18* (2013.01); *A47G 21/185* (2013.01); *B29L 2023/008* (2013.01)

(58) Field of Classification Search
CPC .... A47G 21/18; A47G 21/187; A47G 21/185; B29L 2023/008
USPC ....... 239/13, 16, 33; 215/388; 138/119–121; 220/705–710
See application file for complete search history.

(56) References Cited

U.S. PATENT DOCUMENTS

| | | | |
|---|---|---|---|
| 2,063,803 A | 12/1936 | Gildersleeve | |
| 2,557,411 A * | 6/1951 | Butsch | A47G 21/182 215/388 |
| 3,438,578 A | 4/1969 | Peterson | |
| 3,517,884 A * | 6/1970 | Horvath | A47G 21/182 239/33 |
| 3,606,156 A * | 9/1971 | Homorodean, Jr. | A47G 21/182 215/388 |
| 4,576,336 A * | 3/1986 | Cohen | A47G 21/182 215/389 |
| 4,662,404 A * | 5/1987 | LeVeen | A61M 39/08 138/118 |
| 5,288,019 A * | 2/1994 | Gorochow | A47G 21/187 239/132 |
| 5,415,002 A * | 5/1995 | Koenig | A47G 19/2266 62/338 |
| 5,793,009 A * | 8/1998 | Offer | B23K 9/164 219/136 |
| 5,947,378 A * | 9/1999 | Rebotier | A47G 21/187 239/132.1 |
| 6,073,860 A * | 6/2000 | Coppock | A47G 21/18 215/229 |

(Continued)

*Primary Examiner* — Chee-Chong Lee
*Assistant Examiner* — Joseph A Greenlund
(74) *Attorney, Agent, or Firm* — Gregory M. MacDonald (57) ABSTRACT

The present embodiment provides a straw that is bent near its middle portion to form a reservoir compartment to store a liquid for cooling. When a user sips from the straw, hot liquid from a container enters the reservoir compartment, where it begins to cool towards the surrounding air temperature. When the liquid in the reservoir compartment reaches an acceptable drinking temperature, the user again sips from the straw, which allows him to drink the cooled liquid from the reservoir compartment, and to draw additional hot liquid from the container into the reservoir compartment for cooling.

13 Claims, 5 Drawing Sheets

(56) References Cited

U.S. PATENT DOCUMENTS

| | | | |
|---|---|---|---|
| 6,336,566 B1 * | 1/2002 | Lipson | A47G 19/2227 215/388 |
| 6,460,776 B1 * | 10/2002 | Float | A47G 21/187 239/33 |
| 6,460,777 B2 * | 10/2002 | Float | A47G 21/18 239/33 |
| 6,579,141 B2 * | 6/2003 | Bayliss | A47G 19/2227 220/707 |
| 6,948,633 B2 | 9/2005 | Freek | |
| 7,185,781 B2 | 3/2007 | Pitts | |
| 7,334,609 B2 * | 2/2008 | Petersen | F16L 11/15 138/121 |
| 7,472,725 B2 * | 1/2009 | Rudi | F16L 59/143 138/121 |
| 7,475,792 B2 * | 1/2009 | Hansen | A47G 19/2288 220/495.03 |
| 7,537,173 B1 | 5/2009 | Kogan | |
| 7,698,815 B2 * | 4/2010 | Garner | H01L 23/4093 29/890.032 |
| 7,845,815 B2 * | 12/2010 | Yu | A47G 19/2227 220/710 |
| 8,833,673 B2 * | 9/2014 | Miracle | A47G 21/18 239/33 |
| 8,905,083 B2 * | 12/2014 | Strunk | F16L 11/1185 138/121 |
| D815,479 S * | 4/2018 | Scardino | D7/300.2 |
| 2001/0004009 A1 * | 6/2001 | MacKelvie | F24D 17/0005 165/47 |
| 2007/0001022 A1 * | 1/2007 | Chuang | A47G 21/187 239/33 |
| 2007/0137244 A1 * | 6/2007 | Provencher | A47G 21/187 62/457.3 |
| 2008/0075809 A1 * | 3/2008 | Anderson | A47G 21/183 426/85 |
| 2009/0065512 A1 * | 3/2009 | Baldrige | A47G 21/187 220/592.16 |
| 2011/0056581 A1 * | 3/2011 | Diels | F16L 11/111 138/120 |
| 2011/0057050 A1 * | 3/2011 | Shakur-Jenkins | A47G 21/182 239/33 |
| 2011/0121094 A1 * | 5/2011 | Burney | A47G 21/182 239/24 |
| 2014/0339325 A1 * | 11/2014 | Williams | A47G 21/186 239/33 |
| 2015/0014431 A1 * | 1/2015 | Whittaker | A47G 21/182 239/33 |
| 2015/0335186 A1 * | 11/2015 | MacDonald | A47G 21/187 239/13 |

* cited by examiner

| Time (min:sec) | Container (deg. F) | Straw (deg. F) | Delta (deg. F) |
|---|---|---|---|
| 00:00 | 180 | 72 | 108 |
| 00:30 | 180 | 138 | 42 |
| 01:00 | 178 | 132 | 46 |
| 01:30 | 178 | 128 | 50 |
| 02:00 | 177 | 125 | 52 |
| 02:30 | 176 | 122 | 54 |
| 03:00 | 175 | 145 | 30 |
| 03:30 | 174 | 139 | 35 |
| 04:00 | 173 | 134 | 39 |
| 04:30 | 173 | 130 | 43 |
| 05:00 | 172 | 151 | 21 |
| 05:30 | 171 | 143 | 28 |
| 06:00 | 170 | 139 | 31 |
| 06:30 | 170 | 135 | 35 |
| 07:00 | 169 | 132 | 37 |
| 07:30 | 168 | 128 | 40 |
| 08:00 | 168 | 152 | 16 |
| 08:30 | 166 | 146 | 20 |
| 09:00 | 166 | 142 | 24 |
| 09:30 | 165 | 137 | 28 |
| 10:00 | 164 | 134 | 30 |

COOLING STRAW

CROSS-REFERENCE TO RELATED APPLICATION

This application claims the benefit of U.S. Provisional Application Ser. No. 62/001,582, filed May 21, 2014, the entire contents of which is hereby incorporated herein by reference for all purposes as if fully set forth herein, under 35 U.S.C. 119(e).

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND OF THE INVENTION

1. Field of the Invention

The present invention relates to a tubing for consuming liquids and more particularly to a straw for drinking liquids.

2. Description of Related Art

Having a hot liquid, such as a coffee, tea, hot chocolate, and the like, has become ubiquitous and often indispensable to our work and personal life. A hot caffeinated liquid allows us to become alert and to focus on the task at hand. However, these liquids are often too hot to drink immediately. Waiting for a hot liquid to cool to an acceptable drinking temperature, deprives us of the pleasure of immediately drinking the liquid and the alertness we desire. Many would-be coffee drinkers may drive their entire way to work drowsy, because their coffee is simply too hot to drink. As a result, the need exists to quickly cool a hot liquid to allow the user to immediately enjoy it.

Despite the risk of burning your mouth, there are many advantages to drinking through a straw. A straw allows you to drink without tilting the container towards you, which lowers the risk of scalding yourself if the lid pops off. Straws allow you to sip a liquid without holding the container, which leaves your hands free to perform other tasks. Straws allow you to drink while holding the container below your face, which provides an unobstructed view of the road while driving. Straws allow liquids to bypass your teeth, which avoids pain to sensitive teeth and helps prevent tooth staining.

Despite these advantages, existing straws in the marketplace do not allow for a consumer to safely drink hot liquids. Starbucks, a major coffee retailer, even warns of this danger by printing on each of its straw wrappers: "Not Recommended For Use In Hot Liquids." Thus, a reliable way to avoid burning your mouth while drinking a hot liquid through a straw is needed without waiting for the entire contents of the container to cool to an acceptable drinking temperature. Currently, a user is forced to decide between drinking coffee that is too hot and risk scalding his mouth, or delaying the pleasure of drinking coffee until it cools and risk waiting too long and being left with cold coffee.

U.S. Pat. No. 7,185,781 allows air to enter a coffee cup lid and mix with coffee that a user is about to drink. However, a user does not have the advantage of using a straw to drink the coffee. Still another design, U.S. Pat. No. 5,947,378 provides a straw with a spiral core insert to increase the rate of cooling. However, this design requires additional material and labor to manufacture such a device. A further design, U.S. Pat. No. 6,460,776 provides an insulated drinking straw for hot liquids, which contains an outer insulating member to avoid burning the user's lips. However, this design does not cool the liquid itself, so it is still possible for a user to burn other parts of his mouth if the liquid is too hot.

Accordingly, there is a need for a device that quickly, inexpensively, and reliably cools a hot liquid before the user drinks it, thereby eliminating the chance a user may burn his mouth. The embodiment described in this patent application fulfills these needs and creates other utility.

SUMMARY OF THE INVENTION

It is a principal object to solve the disadvantages with other attempted solutions by providing a device that reliably cools a hot liquid, eliminates the chance a user will burn his mouth, and is less expensive to manufacture than other attempted solutions. The present embodiment is a device that meets these objectives and provides other utility. The present embodiment is comprised of a straw for drinking liquids constructed from an elongated tubing. The first end of the straw is submerged in a liquid in a container, and the second end is placed in the user's mouth, attached to a pump, or otherwise configured so that a vacuum can be applied to it. Between the first and second ends, the straw contains a reservoir compartment, which is located outside of the container, to temporarily store a portion of the liquid. The reservoir compartment is formed by bending the straw between the first and second ends.

When a user first sips on the second end of the straw, a portion of the liquid is vacuumed from the container, through the first end of the straw, and into the reservoir compartment. The user then ceases sipping and waits until the liquid in the reservoir compartment adjusts towards the surrounding air temperature. This temperature adjustment partially occurs due to heat conduction from the liquid into the material comprising the walls of the straw. It also partially occurs due to heat convection from the exterior walls of the straw into the surrounding air.

After the liquid in the reservoir compartment reaches an acceptable drinking temperature, the user sips again from the second end of the straw. In doing so, the user consumes the portion of the liquid that was in the reservoir compartment, and another portion of the liquid is vacuumed from the container and into the reservoir compartment. This portion then begins to adjust towards the surrounding air temperature.

By continuing to take short sips from the second end of the straw, and then waiting while the portion of the liquid in the reservoir compartment adjusts towards the surrounding air temperature, the user may consume the liquid from the reservoir compartment at an acceptable drinking temperature.

In the case where the liquid in the container is initially hot, this device allows a portion of this hot liquid to enter the reservoir compartment where it cools towards the surrounding air temperature outside of the container. For example, in the case where the container initially contains hot coffee, the user would first sip from the second end of the straw until a portion of the hot coffee from the container enters the reservoir compartment. The user would then cease sipping, so that this portion of coffee remains in the reservoir compartment. The user would then wait until the coffee in the reservoir compartment cooled to a warm temperature. The user would then take a second sip from the straw until he consumes the coffee that has cooled to a warm temperature from the reservoir compartment. In doing so, additional hot coffee from the container is vacuumed into the reservoir compartment, where it too begins to cool towards the surrounding air temperature. By continuing to take short sips from the second end of the straw, and then waiting while the portion of the hot liquid in the reservoir compartment cools towards the surrounding air temperature, the user may continue to drink the entire beverage in increments.

The embodiment of this invention is an advantage over conventional straws, which offer no effective means to cool the liquid. The user of a conventional straw must wait until all of the liquid in the container has cooled to an acceptable temperature to avoid burning one's mouth. The user of this device may consume the entire contents of the container more quickly than using a conventional straw. This is because the portion of liquid that enters the reservoir compartment cools at a faster rate than the liquid that remains in the container. This is due to the shorter distance the heat in the center of the reservoir compartment needs to travel to the inner wall surface of the reservoir compartment, as compared with the longer distance the heat in the center of the container needs to travel to the inner wall surface of the container. Thus, the user of this device may quickly cool the coffee in portions using the reservoir compartment, while the user of a conventional straw must wait until the entire contents of the container have cooled to an acceptable temperature.

For purposes of summarizing the embodiments disclosed within and the advantages achieved over other attempted solutions, certain objects and advantages of the embodiments have been described herein above. Of course, it is to be understood that not necessarily all such objects or advantages may be achieved in accordance with any particular embodiment. Thus, for example, those skilled in the art will recognize that these embodiments may be carried out in a manner that achieves or optimizes one advantage or group of advantages as taught herein without necessarily achieving other objects or advantages as may be taught or suggested herein. For example, the device can be used to cool a hot liquid from a machine, equipment, or other mechanism without the liquid being consumed as a beverage.

All of these embodiments are intended to be within the scope herein disclosed. These and other embodiments will become readily apparent to those skilled in the art from the following detailed description of the preferred embodiments having reference to the attached figures, the embodiments not being limited to any particular, preferred embodiments disclosed.

BRIEF DESCRIPTION OF THE DRAWINGS

The accompanying drawings, which are incorporated in and constitute a part of this specification, illustrate several aspects described below.

DETAILED DESCRIPTION OF THE INVENTION

It is to be understood that this invention is not limited to particular embodiments described, as such may, of course, vary. It is also to be understood that the terminology used herein is for the purpose of describing particular embodiments only, and is not intended to be limiting, since the scope of this invention will be limited only by the appended claims. The contents of all reference(s), patent(s), and patent application publication(s) cited in this application are hereby incorporated by reference in their entireties. In the following detailed description, numerous specific details are set forth in order to explain and provide a thorough understanding of the present invention. However, it is apparent that the present invention may be practiced without these specific details.

A device for cooling hot liquids is described wherein the device comprises an elongated tubing with two ends and a reservoir compartment between these two ends. The first end is submerged in a liquid in a container. The second end and the reservoir compartment are located outside of the container. The reservoir compartment allows a portion of liquid from the container to adjust towards the surrounding air temperature outside of the container.

Figure 1:
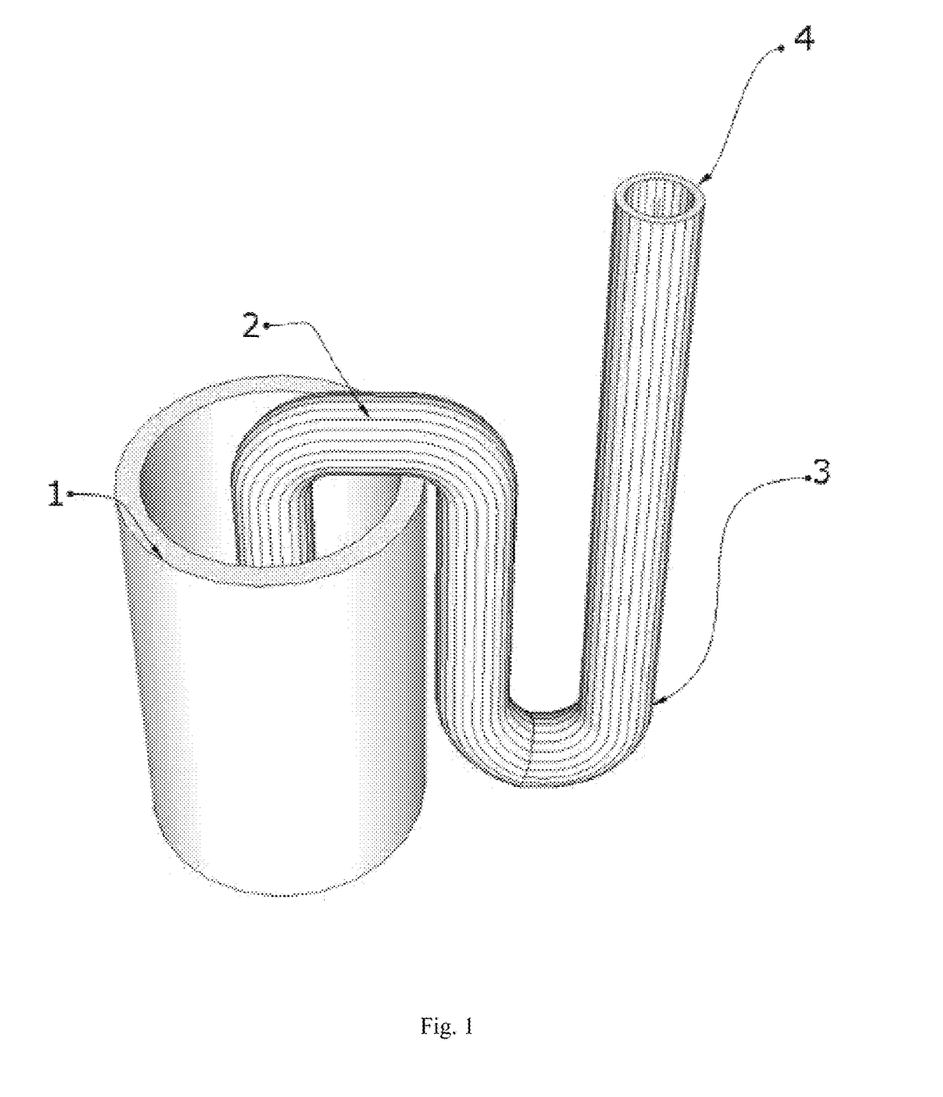
FIG. 1 is a perspective view of the device in which at least one of the embodiments of this invention is implemented.
Figure 2:
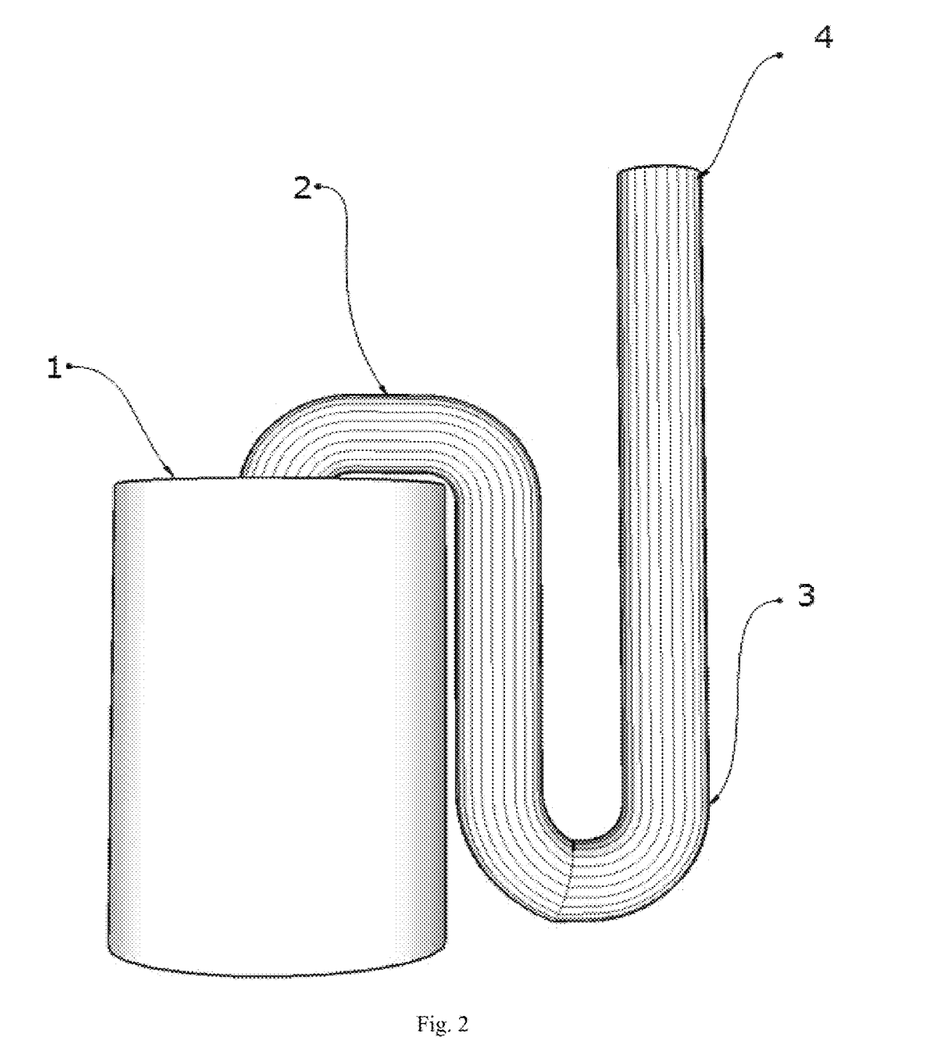
FIG. 2 is a side view of the device in which at least one of the embodiments of this invention is implemented.
Figure 3:
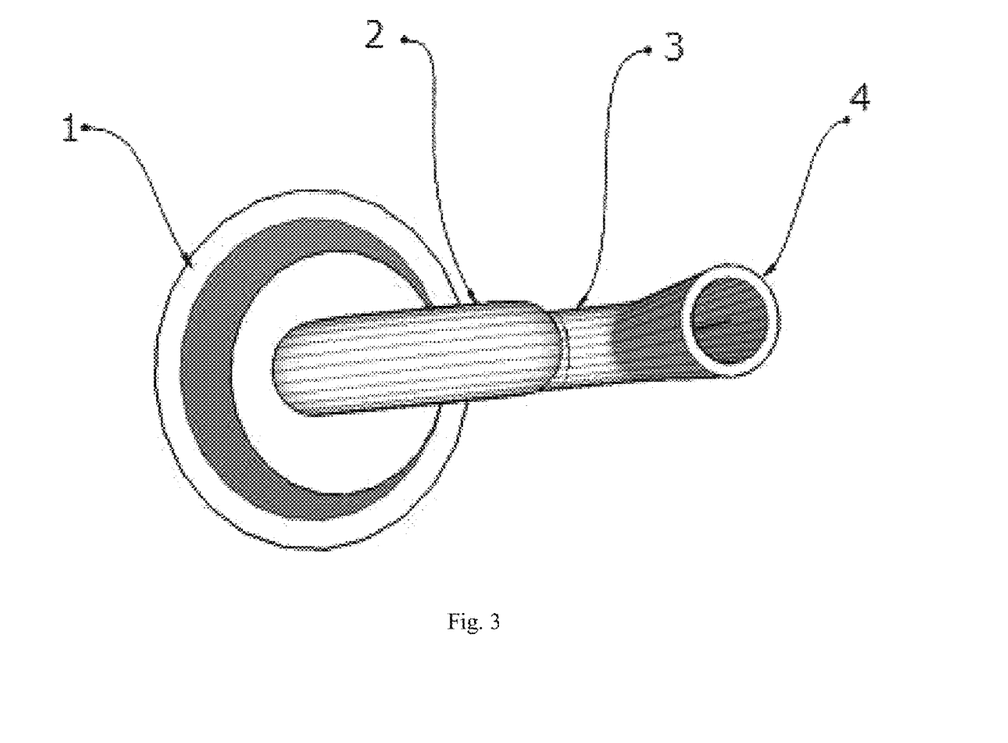
FIG. 3 is a top view of the device in which at least one of the embodiments of this invention is implemented.

The embodiment shown in FIGS. 1-3 contemplates a diameter of the straw approximately ranging from ¼-inch to ¾-inch. The bend 2, which may be in the form of an upside down u-shape, is contemplated to be at a higher elevation than the reservoir compartment 3. Specifically, bend 2 is contemplated to extend above the top height of the liquid in the container 1, and may extend above the top rim of the container 1 by approximately ¼-inch to 2-inches or more. The bend forming the reservoir compartment 3, which may be in the form of a u-shape, is contemplated to be between approximately ¼-inch to 2-inches from the bottom of the container 1. The second end 4 of the straw is contemplated to extend approximately 1 to 5 inches above the top of the container 1, so the user may comfortably place his lips around the second end 4 of the straw to apply a vacuum. Alternatively, the user may attach a mechanism to the second end 4 of the straw to provide a vacuum.

Embodiments may use any particular material for the elongated tubing or straw. For example, the straw may be molded from any plastic, metal, glass, paper, wood, or other materials. The straw may be attached or secured to the container 1 using any mechanism, such as screw(s), bolt(s), adhesive, resin, mechanical frictional elements such as tabs and slots, or other means. The reservoir compartment 3 is formed by bending the straw between the first and second ends. The straw can be made by first heating a plastic tubing with a heat gun similar to a hair dryer in an area about one-third of the distance from the first end. The heated portion of the tubing is then bent about 180 degrees over a half-circular mandrel to form a shape similar to an upside down "U". The straw is then heated in an area about one-third of the distance from the second end 4. The heated portion of the tubing is then bent 180 degrees over a half-circular mandrel in the opposite direction of the first bend to form a shape similar to an upside right "U".

In other words, the reservoir compartment 3 is formed by bending the tubing that extends downward alongside the outside of container 1 at a point below the top level of the liquid in container 1 in the opposite direction upwards to form a u-shaped bend. The tubing, which is formed from the bent tubing alongside the outside of container 1, then continues to extend upwards from the reservoir compartment 3 to a point above the top level of the liquid in container 1. In this way, the reservoir compartment 3 is inexpensively constructed by bending a section of the tubing between said first and second ends. The second end of the tubing 4 extends upwards outside container 1 until it reaches a point above the rim of container 1 to make it easy for the user to either sip or apply a vacuum to the second end of the tubing 4.

In FIGS. 1-3, there is shown an elongated tubing, to be used as a straw, where the first end is submerged in a liquid in container 1. The tubing extends upward from container 1 to a point 2 above the top height of the liquid in the container 1. The tubing then bends downwards alongside the outside of container 1 towards the bottom of container 1. Near the outside bottom of container 1, at a point below the top level of the liquid in container 1, the tubing enters reservoir compartment 3. In this embodiment, when the user sips or applies a vacuum to the second end of the straw 4, a small amount of the liquid in container 1 is vacuumed into the portion of the straw between the first and second ends that forms the reservoir compartment 3. In traveling to the reservoir compartment 3, the liquid travels through the straw and crests over the top level of the liquid in container 1 at point 2 before traveling downwards into reservoir compartment 3. As the user continues to sip or otherwise apply a vacuum to the second end of the straw 4, the liquid travels over the rim of the container 1 at the point 2 before entering reservoir compartment 3.

If a hot liquid enters the reservoir compartment 3, it will cool at a faster rate than the liquid remaining inside container 1 mostly due to heat conduction into the material comprising the walls of the straw and heat convection from the exterior walls of the straw into the surrounding air. The user may determine when the liquid in reservoir compartment 3 reaches an acceptable drinking temperature by either estimating the time required for the liquid to cool in the reservoir compartment 3, by touching the outside of the reservoir compartment 3 with his fingers, by observing a visual or audio signal from a temperature sensing device that is connected to the reservoir compartment 3, or by observing a color change in the material used for the reservoir compartment 3 if the material used is a thermochromic material, which changes color reversibly when its temperature is changed. Such a material may be used in either the reservoir compartment or in the entire elongated tubing of the present embodiment.

After the liquid that enters reservoir compartment 3 cools to an acceptable drinking temperature, the user again sips or applies a vacuum to the second end of the tubing 4. By doing so, the cooled liquid in the reservoir compartment 3 is vacuumed into the user's mouth for consumption. Sipping or applying a vacuum to the second end of the tubing 4 also causes additional hot liquid from the container 1 to be vacuumed through the first end of the straw, through the upside down u-shaped bend 2, and into the reservoir compartment 3, where it too begins to cool. In this way, the user may periodically sip from the second end of the straw 4, so that liquid can be consumed from the reservoir compartment 3 after it reaches an acceptable temperature. By periodically sipping the cooled portion of the liquid from the reservoir compartment 3, the user is allowed to consume the liquid at an acceptable drinking temperature, even though the liquid remaining in the container 1 may still be too hot to drink.

As the user sips the liquid from the container 1 through the second end 4 of the straw, the elevation of the liquid decreases in the container 1. The top elevation of the liquid in the reservoir compartment 3 also decreases until it reaches the top elevation of the liquid in the container 1, provided that the top elevation of the liquid in the container 1 is above the bottom of the reservoir compartment 3. After sipping the liquid, if the liquid in the container 1 is at a level below the bottom of the reservoir compartment 3, the liquid in the straw is siphoned through the reservoir compartment 3 and back into the container 1. This is an added benefit, because a container initially containing a hot liquid cools towards the surrounding air temperature as it reaches the bottom of the container 1. Thus, by the time the liquid in the container 1 reaches a level below the reservoir compartment 3, it has likely cooled to a warm temperature. If the liquid at this warm temperature was allowed to remain in the reservoir compartment 3, it would rapidly cool to a less than desirable temperature. In this way, the embodiment allows the liquid to initially cool in the reservoir compartment when the liquid level in the container 1 is above the height of the reservoir compartment 3, and allows the liquid to be siphoned back into the container 1 when the level of the liquid in the container is below the height of the reservoir compartment 3. The level at which the liquid is siphoned back into the container 1 depends on the height of the reservoir compartment 3 above the bottom of the container 1.

In a related embodiment, the elongated tubing has an oval cross-sectional area for the first end, the second end 4, and the reservoir compartment 3. Tubing with a cross-sectional area that is oval in shape increases the rate of cooling by causing the liquid in the tubing to be exposed to a greater amount of surface area than in a straw with a circular cross-sectional area. Because the liquid in the center of an oval straw has a shorter distance to travel to the inner wall surface area of the straw compared to a straw having a circular cross-sectional area, the cooling rate is faster in a straw with an oval cross-sectional area. Thus, heat transfer from the liquid into the material that comprises the walls of the straw, occurs at a faster rate for a straw with an oval cross-sectional area compared to a straw with a circular cross-sectional area. As a result, the cooling of liquid in a straw with an oval cross-sectional area is much faster than in a straw with a circular cross-sectional area. Similarly, elongated tubing that is rectangular or that has another non-circular shape may be used to speed cooling.

In a related embodiment, the elongated tubing may have a cross-sectional area for the first end and the second end that is selected from the group consisting of circular, non-circular, oval, triangular, square, and rectangular. However, the cross-sectional area for the reservoir compartment 3 has a different cross-sectional area to allow for cooling the liquid in the reservoir compartment 3 at a faster rate. For example, the cross-sectional area for the first end and the second end may be circular, while the cross-sectional area for the reservoir compartment 3 may be selected from the group consisting of non-circular, oval, triangular, and rectangular. Since most of the cooling occurs in the reservoir compartment 3, the cross-sectional area in this portion is configured to a non-circular shape, which increases the rate of cooling in the reservoir compartment 3.

In a related embodiment, the elongated tubing has a reservoir compartment 3 made of a metal, while the remaining parts of the elongated tubing is selected from the group consisting of plastic, glass, wood, and paper. Since metal has a higher rate of thermal conductivity than plastic, glass, wood, and paper; a metal reservoir compartment 3 allows for liquid in the reservoir compartment 3 to cool at a faster rate. The advantage of using an insulator such as plastic, glass, wood, and paper for the first end of the elongated tubing is that it does not conduct heat from the hot liquid in the container 1 to the liquid in the reservoir compartment 3.

In a related embodiment, the elongated tubing has a reservoir compartment 3 made of a thermochromic material, while the remaining parts of the elongated tubing is selected from the group consisting of plastic, metal, glass, wood, and paper. Since the user is primarily concerned with the temperature of the liquid in the reservoir compartment, it may be less expensive to only use a thermochromic material in this area.

In an alternative related embodiment, the user vacuums a small portion of a frozen liquid, such as a slushie, icee, frappuccino, or similar ice drinks, into the reservoir compartment 3 where it is allowed to warm toward the ambient air temperature, allowing the user to enjoy the warmed liquid without toothaches or headaches, which are often referred to as "brain freeze."

Another embodiment contemplates bending the elongated tubing to position the reservoir compartment 3 near the top of the outside of container 1, so that it initially stores liquid when the liquid in the container 1 is at its hottest. Reservoir compartment 3 may also be positioned near the middle of the outside of container 1, so that it initially stores liquid until the container 1 is about half-full. Alternatively, reservoir compartment 3 may be positioned near the bottom of the outside of container 1, so that it continues to store liquid until the container 1 is nearly empty. When the liquid in the container 1 is at an elevation below the bottom of reservoir compartment 3, liquid in of reservoir compartment 3 tends to be siphoned back into the container 1. This is an added benefit, because by the time the liquid in the container 1 reaches this elevation, it usually has cooled to an acceptable drinking temperature, and the reservoir compartment 3 is no longer needed to cool the liquid. By having the liquid siphoned back into the container 1, it remains at an acceptable drinking temperature for a longer period of time, because it is kept warm in the container 1. This maximizes the amount of time the liquid remains at an acceptable drinking temperature. Other configurations are possible as long as the straw has a reservoir compartment 3 outside the container 1, so that the liquid it contains is allowed to readily adjust to the surrounding air temperature outside the container 1.

These and other objects, features and advantages of the present embodiment will become more fully apparent from the following detailed description of the embodiments, the appended claims and the accompanying drawings.

Figure 4:
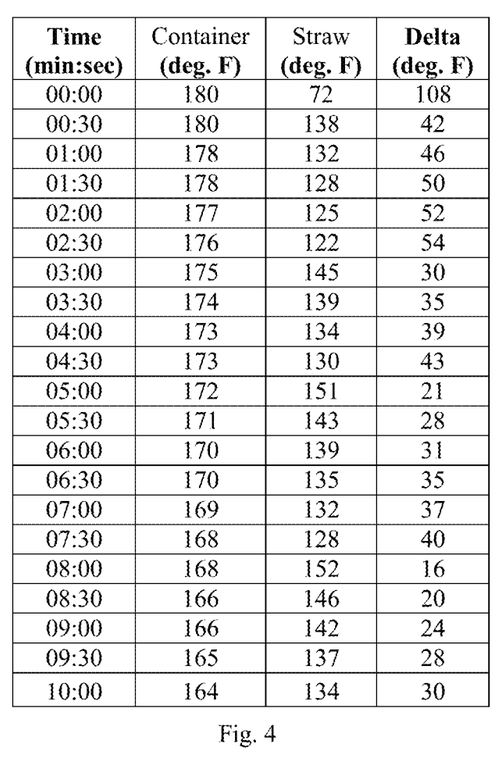
FIG. 4 is a temperature chart illustrating the cooling of a hot liquid in the reservoir compartment as compared to the container during a test.
Figure 5:
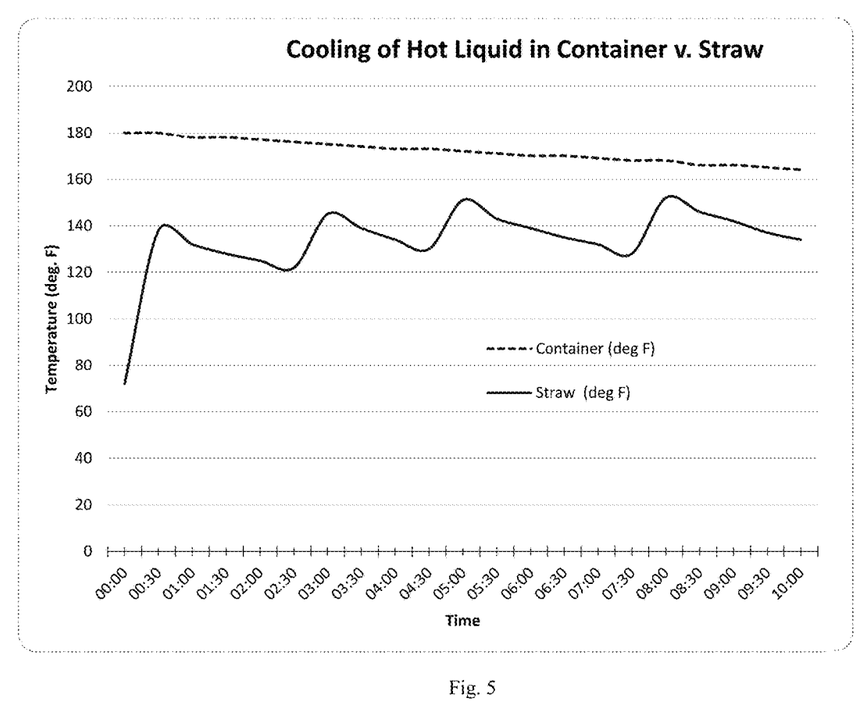
FIG. 5 is a temperature graph, which corresponds to the temperature chart in FIG. 4, where the ordinate of the graph is temperature and the abscissa is time.

This invention is further defined by reference to the following example. It will be apparent to those skilled in the art that many modifications, both to materials and methods, may be practiced without departing from the scope of the current invention. The embodiment described herein was tested in an insulated container 1 without a lid. The temperature was measured using a Fieldpiece ST4 Dual Temperature Meter, model ST4, which measures two temperatures simultaneously using two k-type, wrap-tab beaded thermocouples. One thermocouple was placed in the hot liquid in the container 1. The other thermocouple was placed in the reservoir compartment 3. FIG. 4 shows a temperature chart from this test that compares the cooling of the hot liquid in the container 1 as compared to the cooling of the hot liquid in reservoir compartment 3. In FIG. 5, there is shown a temperature graph, which corresponds to the temperature chart in FIG. 4. The ordinate of the graph is temperature. The abscissa is time.

At the start of the test, where the time is 00:00, the temperature of the liquid in container 1 was initially at 180 degrees Fahrenheit ("deg. F."), which is a typical temperature for coffee to be served. The reservoir compartment 3 was empty and its temperature was 72 deg. F., which was about the same as the surrounding air temperature.

About 30 seconds after the start of the test, the user sipped on the second end of the straw 4 causing a portion of liquid from container 1 to be vacuumed into reservoir compartment 3. As the hot liquid from container 1 entered the relatively cool reservoir compartment 3, heat from the liquid was conducted into the material which comprises the walls of reservoir compartment 3. This caused the hot liquid from container 1 to drop in temperature from 180 deg. F. to 138 deg. F. At the same time, the material comprising the walls of reservoir compartment 3 heated up from 72 deg. F. to 138 deg. F. Assuming that most users prefers a temperature less than 130 deg. F., the user must further wait until the liquid in reservoir compartment 3 cools before taking another sip.

After another 30 seconds, about 1:00 minute from the start of the test, the temperature of the liquid in reservoir compartment 3 has cooled through heat convection into the surrounding air to 132 deg. F.

At about 1:30 from the start of the test, the liquid in reservoir compartment 3 has further cooled to 128 deg. F.

At about 2:00 from the start of the test, the liquid has further cooled to 125 deg. F.

At about 2:30 from the start of the test, the liquid has cooled to 122 deg. F. before it was consumed.

Thus, in just 2:30 minutes, the embodiment of this invention was able to drastically cool a portion of the liquid from 180 deg. F. to 122 deg. F. During this same time, the liquid in container 1 only slightly cooled from 180 deg. F. to 176 deg. F. Thus, the embodiment of this invention cooled a portion of the liquid 54 deg. F. cooler than it would have cooled if it was left in container 1. This shows that the embodiment of this invention is much more effective in cooling a liquid than waiting for it to cool in a container. Therefore, the straw in this embodiment allows a user to drink a liquid at an acceptable drinking temperature much faster than waiting for the liquid to naturally cool in container 1 to an acceptable drinking temperature.

Referring back to FIGS. 4 and 5, it can be seen that when the user took a second sip at about 3:00 minutes into the test, hot liquid in container 1 was at 175 deg. F. As it was drawn into reservoir compartment 3, it immediately cooled it to 145 deg. F. It is interesting to note that while the initial sip caused the liquid to drop 42 deg. F. in temperature from 180 deg. F. to 138 deg. F., the second sip only caused the liquid to drop 30 deg. F. from 175 deg. F. to 145 deg. F. This is because reservoir compartment 3 was at a cooler temperature before the first sip, as compared to as before the second sip. Thus, the reservoir compartment 3 acted as more of a heat sink in cooling the hot liquid during the first sip, as compared to the second sip. In other words, because the temperature of reservoir compartment 3 was cooler before the first sip than before the second sip, it was able to absorb more heat from the hot liquid, which resulted in the entering liquid cooling toward a lower temperature.

Although reservoir compartment 3 starting at a warmer temperature before the second sip, as compared to the first sip, FIGS. 4 and 5 show that the liquid in reservoir compartment 3 was still able to cool at a much faster rate than the liquid in container 1. Specifically, one and a half minutes after the second sip, which is 4:30 into the test, the liquid in container 1 cooled from 175 deg. F. to 173 deg. F., which is just 2 deg. F., while the liquid in reservoir compartment 3 cooled from 145 deg. F. to 130 deg. F., which is 15 deg. F. Thus, the straw of this embodiment was able to initially cool a portion of the liquid from container 1 a full 30 deg. F. (from 175 deg. F. to 145 deg. F.) when it entered reservoir compartment 3, and another 15 deg. F. (from 145 deg. F. to 130 deg. F.) over the next minute and a half. Therefore, the straw of this embodiment was able to cool hot liquid from container 1 a full 45 deg. F. (from 175 deg. F. to 130 deg. F.), when the liquid in container 1 only dropped 2 deg. F. (from 175 deg. F. to 130 deg. F.) during this same time. As a result, the straw of this embodiment cooled a portion of the liquid from container 1 a full 43 deg. F. more than it would have cooled had it been left in the container.

Referring again back to FIGS. 4 and 5, it can be also seen that when the user sips from the second end of the straw right before 5 minutes, the user consumes the liquid in reservoir compartment 3 that had cooled to 130 deg. F. In doing so, additional hot liquid at 172 deg. F. from container 1 is drawn into reservoir compartment 3. When this liquid enters reservoir compartment 3, it quickly cools to 151 deg. F., mostly through heat conduction into the walls that form reservoir compartment 3. Since the temperature of reservoir compartment 3 was initially warmer for the third sip as compared to the first sip, less heat was conducted from the hot liquid entering reservoir compartment 3. Despite this, FIGS. 4 and 5 show that the temperature of the liquid that entered into reservoir compartment 3 after the third sip, still cooled much faster than the temperature in container 1. Specifically, 30 seconds after the third sip at 5:30, the liquid in container 1 cooled just 1 deg. F. (from 172 deg. F. to 171 deg. F.), while the liquid in reservoir compartment 3 cooled 8 deg. F. (from 151 deg. F. to 143 deg. F.). Thus, this also shows the embodiment of this invention is effective at cooling the liquid in reservoir compartment 3 at a much faster rate than the liquid in container 1.

After another 2 minutes at 7:30, the liquid in container 1 cools another 3 deg. F. (from 171 deg. F. to 168 deg. F.), while the liquid in reservoir compartment 3 cools another 15 deg. F. (from 143 deg. F. to 128 deg. F.). Thus, the straw of this embodiment was able to initially cool the liquid from container 1 a full 19 deg. F. (from 172 deg. F. to 151 deg. F.) at 5:00 when it entered reservoir compartment 3, mostly through heat conduction into the walls that form the straw. After just another 2.5 minutes at 7:30, the straw cooled the liquid another 23 deg. F. (from 151 deg. F. to 128 deg. F.), mostly through heat convection from the walls of the straw into the surrounding air. Thus, after 5 minutes (5:00) a user is still able to sip a hot liquid at 172 deg. F. into the reservoir compartment 3, wait just 2.5 minutes until 7:30, and then drink the cooled liquid a full 44 deg. F. cooler (from 172 deg. F. to 128 deg. F.) at the acceptable drinking temperature of 128 deg. F. from reservoir compartment 3. During this same amount of time, the liquid in container 1 only dropped 4 deg. F. (from 172 deg. F. to 168 deg. F.). Therefore, the straw of this embodiment was able to cool the liquid in reservoir compartment 3 an additional 40 deg. F. on the third sip.

Referring again back to FIGS. 4 and 5, it can be seen that the fourth and final sip was taken right before 8 minutes into this experiment or 8:00 when the liquid in container 1 was at 168 deg. F. and the liquid in reservoir compartment 3 was at 128 deg. F. As soon as the user sips the 168 deg. F. liquid from container 1 into reservoir compartment 3, the temperature drops to 152 deg. F.

About 1 minute after the fourth sip, which is at 9:00, the liquid in container 1 cooled just 2 deg. F. (from 168 deg. F. to 166 deg. F.), while the liquid in reservoir compartment 3 cooled 10 deg. F. (from 152 deg. F. to 142 deg. F.). Thus, this shows that the straw that is the embodiment of this invention is still effective at cooling the liquid in reservoir compartment 3 after several sips at a much faster rate than the liquid in container 1 is cooling.

After another 1 minute, which is at 10:00, the liquid in container 1 cooled another 2 deg. F. (from 166 deg. F. to 164 deg. F.), while the liquid in reservoir compartment 3 cools another 8 deg. F. (from 142 deg. F. to 134 deg. F.). Thus, the straw of this embodiment was able to initially cool the liquid from container 1 a full 16 deg. F. (from 168 deg. F. to 152 deg. F.) after even the fourth sip at 8:00. After just another 2 minutes, which is at 10:00, the straw cooled the liquid another 18 deg. F. (from 152 deg. F. to 134 deg. F.), mostly through heat convection from the walls of the straw into the surrounding air. Therefore, the straw of this embodiment was able to cool the liquid in reservoir compartment 3 an additional 34 deg. F. after the fourth sip.

The embodiment described herein can be manufactured inexpensively by bending a straight section of tubing. The tube may also be bent tightly so that the outside diameter of the first end is in contact with the outside diameter of the reservoir compartment, so that the tube may be clipped over the outside wall of the container 1 so that it remains stationary.

What is claimed is:

1. A device for lowering the temperature of hot liquids, comprising:
   a. a container, comprising a rim, an inside surface, an outside surface, a top elevation and a bottom elevation;
   b. an elongated tubing comprising an inside diameter and an outside diameter, comprising:
   i. a first end comprising an inside diameter and an outside diameter;
   ii. a second end, comprising an inside diameter and an outside diameter;
   iii. a first u-shaped bend comprising an inside diameter, an outside diameter, an upper section, and a lower section;
   iv. a second u-shaped bend7 comprising an inside diameter, an outside diameter, an upper section and a lower section;
   v. a first straight section from the first end to the first u-shaped bend;
   vi. a second straight section from the first u-shaped bend to the second u-shaped bend;
   vii. a third straight section from the second u-shaped bend to the second end;
   viii. wherein the first, second, and third straight sections are about the height of the container so that the entire length of the elongated tubing is about three times the height of the container to minimize the length of the elongated tubing;
   ix. wherein the elongated tubing is bent in a single plane;
   x. wherein the second u-shaped bend is bent in the opposite direction of the first u-shaped bend so that both bends are in a single plane;

xi, wherein the first end of said elongated tubing is submerged in a hot liquid in the a container, and the second end of said elongated tubing is placed in the user's mouth; and the first u-shaped bend is bent tightly so that the outside diameter of the first end is in contact with the inside surface of the container, and part of the outside diameter of the second u-shaped bend is in contact with the outside surface of the container so that the elongated tubing may be clipped over the rim of the container of many diameters and wall thickness so that it remains stationary;

c. a reservoir compartment formed in the lower section of the second u-shaped bend to allow hot liquids to cool through heat conduction by directly contacting a single solid wall of a material formed between the inside diameter and the outside diameter of the second u-shaped bend and heat convection from the outside diameter of the second u-shaped bend into the surrounding air; and d. wherein the first end and first straight section and the reservoir are made of different materials.

2. The invention of claim 1, wherein the first u-shaped bend is a bend of about 180 degrees at about one-third of its length from the first end and the second u-shaped bend is a bend of about 180 degrees in the opposite direction at about one-third of its length from the second end to form the reservoir compartment.

3. The invention of claim 2, wherein the elongated tubing is configured so that when the first end is submerged in the container, where the second end remains outside of the container where the cooled liquid exits at a point about 1 to 5 inches higher than the top elevation of the container, and the reservoir compartment remains outside of the container at a point lower than the top elevation of the hot liquid in the container, to allow hot liquids to cool through heat conduction into the material comprising the walls of the elongated tubing and heat convection from the exterior walls of the elongated tubing into the surrounding air.

4. The invention of claim 3, wherein the first end and first straight section of said elongated tubing are made of a material with a low rate of thermal conductivity selected from the group consisting of plastic, glass, wood, and paper to decrease the rate of heat transfer from the liquid in the container.

5. The invention of claim 4, wherein the reservoir compartment and second u-shaped bend of said elongated tubing is made of a material that is metal to increase the rate of heat transfer to the surrounding air.

6. The invention of claim 4, wherein the reservoir compartment of said elongated tubing is made of a material that is thermochromic to visually notify the user when the temperature of the liquid in the reservoir compartment has reached an acceptable temperature to drink.

7. The invention of claim 4, wherein said elongated tubing has a cross-sectional area wherein the cross-sectional area is selected from the group consisting of circular, non-circular, oval, triangular, square, and rectangular.

8. The invention of claim 1 wherein the elongated tubing has a diameter of about ¼-inch to ¾-inch.

9. The invention of claim 5, wherein the third straight section that extends from the reservoir compartment to the second end of the elongated tubing and the second end is comprised of a material with a low rate of thermal conductivity selected from the group consisting of plastic, glass, wood, and paper to decrease the rate of heat transfer from the reservoir compartment to the second end of the elongated tubing to prevent the user from burning his lips on the second end of said elongated tubing.

10. The invention of claim 1, wherein the reservoir compartment formed in the lower section of the second u-shaped bend is between about ¼-inch to ½-inch from the bottom of the container to allow the reservoir compartment to continue to cool liquid from the container until the elevation of the liquid in the container is about ¼-inch to ½-inch from the bottom of the container, which is the same elevation as the reservoir compartment, to allow the user to continue to cool the liquid in the container until it is nearly at the bottom of the container.

11. The invention of claim 1, wherein the reservoir compartment formed in the lower section of the second u-shaped bend is between about ½-inch to 2-inches from the bottom of the container to allow the reservoir compartment to cool liquid from the container until the elevation of the liquid in the container is about ½-inch to 2-inches from the bottom of the container, which is the same elevation as the reservoir compartment, to allow the user to continue to cool the liquid in the container until it is about ½-inch to 2-inches from the bottom of the container, after which when the liquid in the container is at a level below the bottom of the reservoir compartment, the liquid in the elongated tubing is siphoned back through the reservoir compartment and into the container, where the last remaining ½-inch to 2-inches of liquid in the container, so that it remains at a warm temperature until the user completes drinking the liquid.

12. The invention of claim 5, wherein the second straight section of said elongated tubing that extends from the first u-shaped bend to the reservoir compartment is comprised of a material with a low rate of thermal conductivity selected from the group consisting of plastic, glass, wood, and paper to decrease the rate of cooling of liquid in the container.

13. The invention of claim 5, wherein the second straight section of said elongated tubing comprises a metal material with a high rate of thermal conductivity to increase the rate of cooling of liquids in the reservoir compartment and the second u-shaped bend into the surrounding air.

* * * * *